Oct. 27, 1931.                D. H. McMURTRY                1,829,289
                            LAWN MOWER SHARPENER
                              Filed Oct. 9, 1928
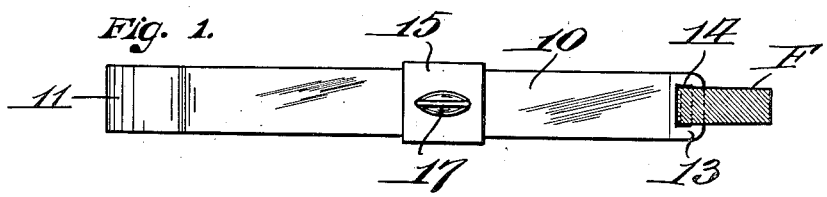
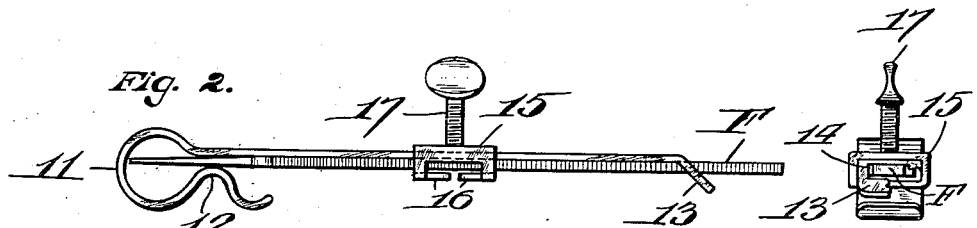
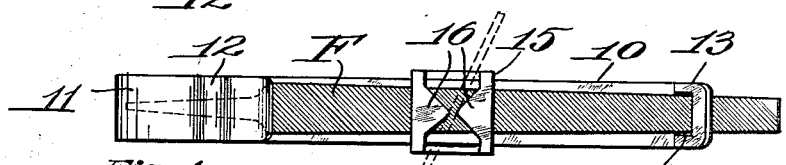
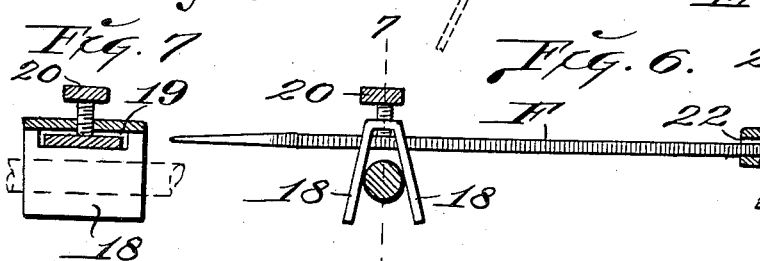
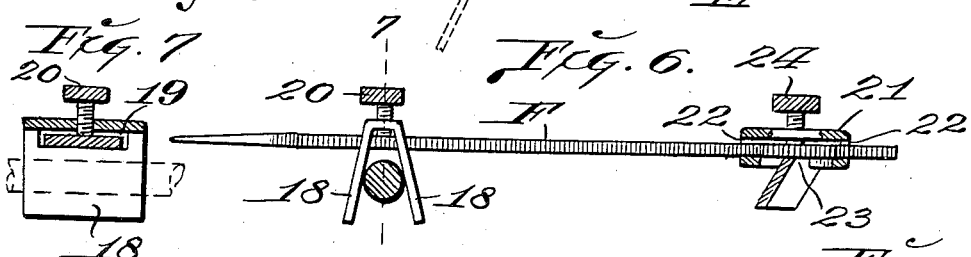
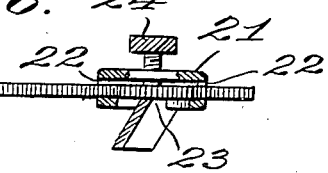
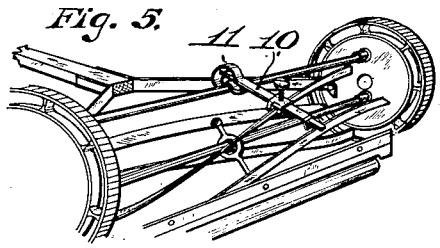
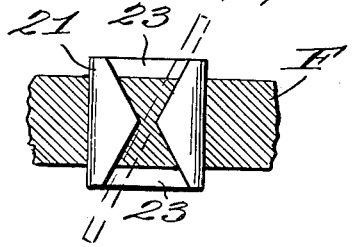
INVENTOR.
DONALD H. McMURTRY.
BY
Martin P. Smith
ATTORNEY.

Patented Oct. 27, 1931

1,829,289

UNITED STATES PATENT OFFICE

DONALD H. McMURTRY, OF LOS ANGELES, CALIFORNIA

LAWN MOWER SHARPENER

Application filed October 9, 1928. Serial No. 311,282.

My invention relates to a lawn mower sharpener, and has for its principal object the provision of a relatively simple, practical and inexpensive device that may be advantageously employed for sharpening the cutting edges of the blades of a lawn mower.

Further objects of my invention are to generally improve upon and simplify the construction of the existing forms of manually operable lawn mower sharpening devices, to provide a device of the character referred to that may be readily combined with the standard makes of ordinary double face flat files, and further to provide a sharpening device that may be readily adjusted for use upon lawn mowers of different makes and sizes.

With the foregoing and other objects in view, my invention consists in certain novel features of construction and arrangement of parts that will hereinafter be more fully described and claimed and illustrated in the accompanying drawings, in which:—

Fig. 1 is a top plan view of a lawn mower especially constructed in accordance with my invention.

Fig. 2 is a side elevational view of the sharpener.

Fig. 3 is an end elevational view of the sharpener with parts broken away.

Fig. 4 is a view looking against the underside of the sharpening device.

Fig. 5 is a perspective view of a lawn mower and showing my improved sharpening device positioned for use thereupon.

Fig. 6 is a side elevational view of a modified form of the lawn mower sharpener.

Fig. 7 is a vertical section taken on the line 7—7 of Fig. 6.

Fig. 8 is a view looking against the underside of the blade engaging member that forms a part of the modified construction.

Referring by numerals to the accompanying drawings and particularly to the form of sharpening device illustrated in Figs. 1 to 4 inclusive, 10 designates a flat bar or strap of metal that forms the main body of the sharpening device, and one end of this strap or bar is bent to form an open loop 11, and the end of the material from which the strap or bar is formed adjacent to this loop, extends beneath the body of the bar or strap and this particular portion is bent to form an inverted channel-shaped guide or bearing member 12 that occupies a transverse position beneath the end portion of the body 10 and said inverted channel shaped member is adapted to bear on the tie rod that connects the side frames of the lawn mower.

The end of the body 10 opposite the end that is provided with the loop 11 and bearing 12 is bent downwardly at an angle to form an ear 13, and formed in this ear is a transversely disposed slot or aperture 14 for the accommodation of the file F that forms a part of the sharpening device.

Encircling the strap or bar 10 is a substantially rectangular loop 15 of metal and the bottom plate or wall thereof is cut away so as to provide a transverse opening for the accommodation of the edges of the blades of the lawn mower when the sharpening device is applied thereto and projecting toward each other into this opening from opposite sides of the bottom plate of the loop are substantially triangular lugs 16 which, when the device is in use, bear on the side faces of the blades while the same are engaged by the file.

The loop 15 is constructed so that it may be adjusted to any point throughout the length of the body 10 and the file that is positioned beneath said body and to lock said loop to the body and file a thumb screw 17 is screw seated in the top plate of the loop and when tightened clamps the loop against the body and file.

When a standard form of flat double face file is applied to the holder comprising the body 10 and associated parts, the file is inserted through the slot 14 in ear 13, thence through the loop 15 and the pointed shank on the end of the file that ordinarily receives a handle is inserted in the open loop 11 between the bearing 12 and the end portion of the body 10.

To use the sharpener on a lawn mower the latter is turned upside down and the screws that hold the cutter bar of the lawn mower are loosened so as to permit the reel that carries the blades to rotate freely. The bearing 12 is now placed upon the tie rod that connects the side frame of the lawn mower and the loop 15 is now adjusted lengthwise on the holder and file so as to receive the edge of the blade that is to be sharpened and the thumb screw 17 is now tightened to clamp the loop to the body of the sharpener and the file carried thereby.

The ends of the holder are now manually engaged and said holder is reciprocated from one side of the lawn mower to the other, and during such reciprocation the device is firmly supported and guided by the engagement of bearing 12 upon the tie rod. During this reciprocating action of the sharpening device the cutting edge of the blade is engaged by that portion of the face of the file that is exposed in the opening in the underside of the loop 15 and due to abrasive action of the file upon the edge of the blade the latter will be quickly sharpened.

During the sharpening operation just described it will be understood that the blade that is engaged by the file carried by the device will swing toward and away from the tie rod due to the fixed distance between the bearing 12 and the loop 15 which receives the edge of the blade and holds the same in proper position to be engaged by the file.

In the event that a standard form of flat file is not available for use in my improved sharpening device, a short section of file or a short flat piece of abrasive material, such as carborundum, may be arranged in the loop 15 beneath the body 10 and thereby produce the desired results.

In the modified construction illustrated in Figs. 6 to 8, inclusive, the strap or bar 10 is dispensed with and a guiding member and a blade engaging member are adjustably mounted upon an ordinary flat double face file.

The guiding member that engages the tie rod of the lawn mower is constructed from suitable sheet metal, the same being bent to form an inverted V-shaped member 18 and formed in the upper portions of the legs of said member are transverse slots 19 for the accommodation of the file F.

Passing through the apex of the guiding member 18 is a set screw 20 which, when the guiding member is applied to the file, enables said guiding member to be clamped to and locked upon said file at any desired point throughout its length.

The blade engaging loop 21 is formed from suitable sheet metal of such size as to receive the body of the file F, and formed in the end walls of this loop are transverse slots 22 for the reception of the file.

The underside of the loop is cut away to form a substantially X-shaped opening 23 for the accommodation of the edge of the blade that is being sharpened and this guiding loop is clamped to the file at any desired point by means of a set screw 24 that passes through the top of the loop and bears directly upon the file.

The operation of this form of the device is practically identical with the operation of the form of device previously described, and when the tie rod is engaged by the inverted V-shaped bearing member 18 and the entire device is reciprocated, the edge of the engaged blade positioned in the opening 23 will be engaged by the file and the edge of said blade rapidly sharpened.

Thus it will be seen that I have provided a lawn mower sharpening device that is relatively simple in construction, inexpensive of manufacture, capable of being used on lawn mowers of different sizes and makes, and said device being very effective in performing the functions for which it is intended.

A particularly desirable feature of my invention is the construction of the device whereby it may be readily associated with the standard makes of flat double face files.

It will be understood that minor changes in the size, form and construction of the various parts of my improved lawn mower sharpener may be made and substituted for those herein shown and described without departing from the spirit of my invention, the scope of which is set forth in the appended claims.

I claim as my invention:

1. The combination with a standard double face flat file, of a bar adapted to be applied to and overlie said file, a bearing on one end of said bar, the opposite end of the bar being provided with an aperture for the reception of said file, a loop adjustably mounted on said bar and file, the lower plate of which loop is provided with an opening for the reception of a lawn mower blade, and means for locking said loop to said bar and file in differently adjusted positions.

2. The combination with a flat double faced file, of a straight flat bar adapted to be applied to and overlie said file, one end of said bar being rebent and formed into a bearing adapted to engage a straight transverse member on a lawn mower, a loop encircling said bar and file, the lower portion of which loop is provided with a substantially X-shaped opening for the reception of a lawn mower blade, and means carried by said loop for securing same to said bar and file in differently adjusted positions and for clamping said file to said bar.

3. The combination with a flat double faced file, of a straight flat bar adapted to be applied to and overlie said file, one end of which bar is bent downwardly and thence inwardly so as to occupy a position beneath the body of the bar, the underlying bent end of the bar being provided with a transverse bearing for engaging the cross member of a lawn mower, a loop encircling said bar and file and adjustable longitudinally thereupon, the lower portion of which loop is provided with a substantially X-shaped opening for the reception of the edge portion of a lawn mower blade, and means carried by said loop for securing the same to the blade and file in differently adjusted positions and for clamping said file and bar to each other.

4. In a lawn mower sharpener, a straight flat bar having one end rebent and formed into a bearing that is adapted to engage the cross member of a lawn mower, said bar being provided adjacent to one end with an opening for the reception of the end portion of a flat file that is positioned beneath the bar, a loop adjustably arranged on said bar, and provided in its under portion with an opening for the reception of the edge of a lawn mower blade and a set screw seated in said loop for clamping the same to the bar in differently adjusted positions and for clamping the bar to the file that is positioned beneath said bar.

5. The combination with a flat file, of a straight flat bar, having one end rebent to form a bearing for engaging the cross member of a lawn mower, said bar also having an aperture for the reception of the file, a lawn mower blade engaging loop surrounding said file and bar, and means carried by said loop for securing same to the bar in differently adjusted positions and for clamping said file and bar to each other.

6. A lawn mower sharpener, comprising a straight flat bar having one end rebent and formed into a bearing that is adapted to slidably engage the cross member of a lawn mower, said bar having an opening for the reception of the file that is associated with said sharpener, a lawn mower blade guide adjustably mounted on said bar, means for locking said blade guide to said bar, said blade guide being provided with slots for the accommodation of the bar and the file to which said bar is applied and the lower portion of said blade guide being provided with pairs of oppositely arranged inclined blade engaging faces.

7. A lawn mower sharpener, comprising a straight flat bar having one end rebent and formed into a bearing that is adapted to slidably engage the cross member of a lawn mower, said bar also having an aperture for the reception of the file that is associated with said sharpener, a lawn mower blade guide adjustably mounted on said bar, means for locking said blade guide to said bar, said blade guide being provided with slots for the accommodation of the bar and the file to which said bar is applied and substantially triangular lugs formed on the lower portion of said blade guide, which lugs project toward each other.

In testimony whereof I affix my signature.

DONALD H. McMURTRY.